Patented Dec. 22, 1942

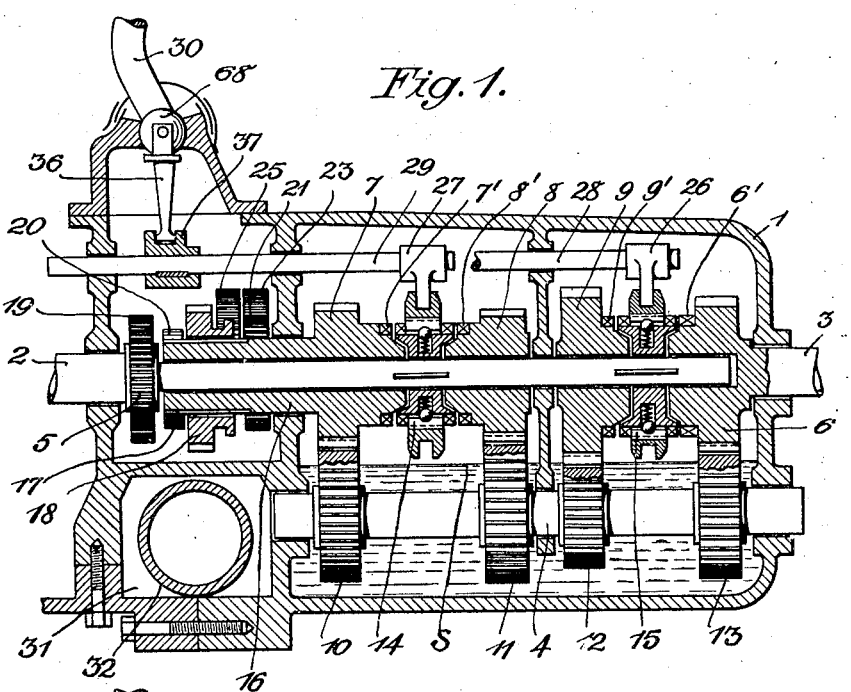
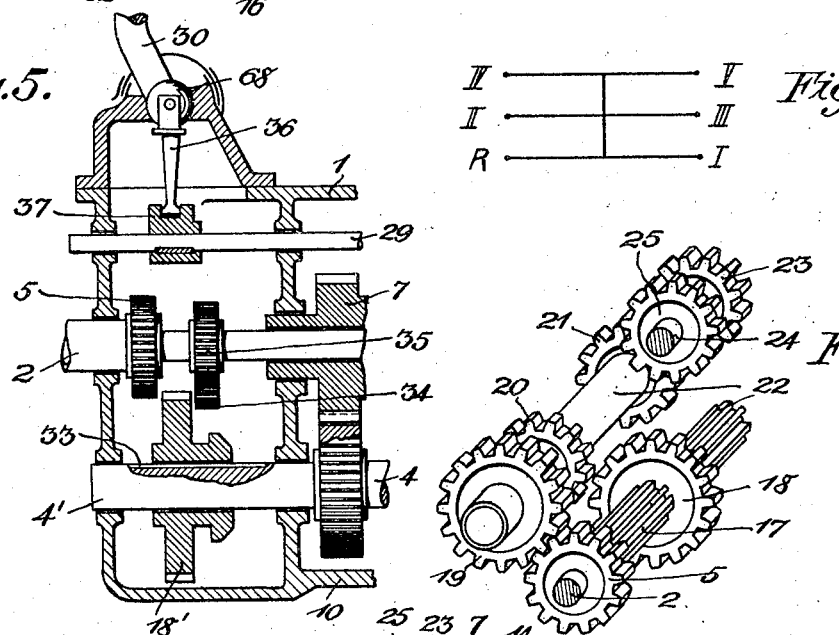

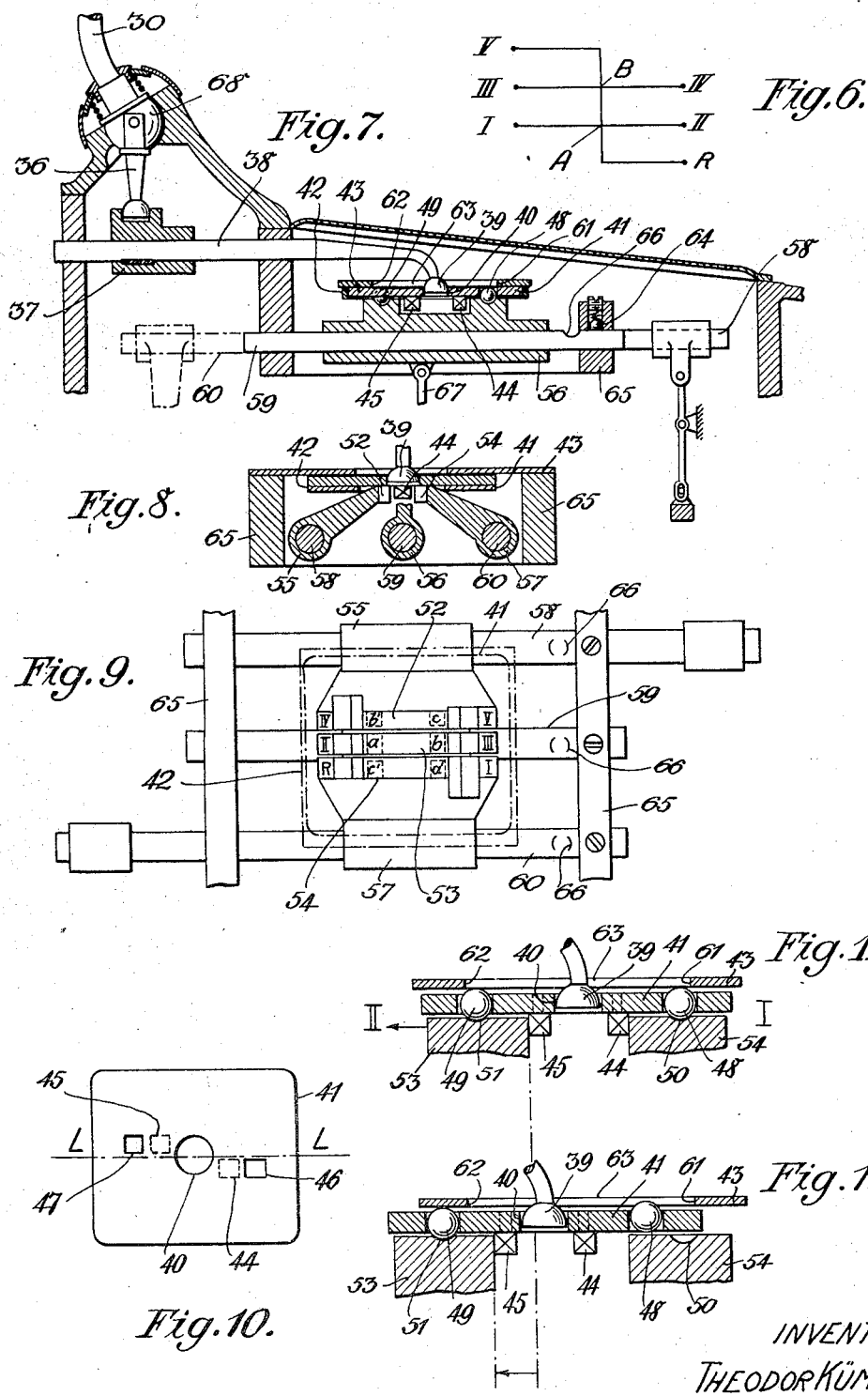

2,305,927

UNITED STATES PATENT OFFICE 2,305,927

CHANGE SPEED GEARING

Theodor Kümmich, Stuttgart, Germany; vested in the Alien Property Custodian

Application February 21, 1939, Serial No. 257,627
In Germany February 26, 1938

32 Claims. (Cl. 74—333)

The present invention relates to improvements in multi-speed change-speed gearing particularly for motor vehicles wherein the speeds are preferably engaged by means of a so-called synchronising clutch.

One object of the invention is primarily to keep the acceleration and deceleration forces for the synchronisation as small as possible in order to avoid wear and tear of the gearing. Furthermore, particularly when the gearing is used as a motor-vehicle drive, an object is to gain floor-freedom for the driver's feet directly above the gearing housing. Finally, an object is to make the whole gearing as simple as possible constructionally, as well as compact and light.

The acceleration and deceleration of large inertia masses is avoided according to the invention because the gearing comprises a constant exit drive for all speeds.

The desired free space directly above the gear box is obtained by reason of the fact that the finger for moving the actuating rods is mounted upon a separate longitudinally displaceable stem which lies substantially parallel to the gearing shafts and is moved and turned by an extension of the gear-changing lever. This arrangement allows the bearing of the gear-changing lever to be disposed at one end of the gear box so as to leave a free space above the latter.

Finally, an object of the invention is to effect a saving in actuating rods and members transmitting their force and movement. For this purpose, there may be several actuating rods arranged side by side and actuated selectively in either longitudinal direction by locking members. For example, an actuating plate may be used which is longitudinally and transversely displaceable and is provided with recesses for the locking members which project at the same time into recesses on the actuating rods. This plate is moved over the actuating rods under a fixed locking plate. The first actuating rod actuates the fourth and fifth speeds, the second or middle rod actuates the second and third speeds and the third rod actuates the first and reverse speeds. As will appear, such an arrangement requires only three actuating rods for all five forward speeds and the reverse speed.

The foregoing and other objects and features will be hereinafter particularly described and claimed.

The invention is illustrated in several embodiments by way of example in the annexed drawings, in which:

Figure 1 is a longitudinal section of a five-speed change-gearing.

Figure 2 is a perspective view of a preliminary train in the said gearing.

Figure 3 is an actuating diagram for the gearing of Figure 1.

Figure 4 is a combined sectional view and actuating diagram.

Figure 5 is a sectional view of another form of preliminary gearing.

Figure 6 is an alternative actuating diagram.

Figure 7 is a sectional view of actuating mechanism for operating in accordance with the diagram of Figure 6.

Figure 8 is a cross section of Figure 7.

Figure 9 is a plan of the actuating rods seen in Figure 8.

Figure 10 is a plan of an actuating plate seen in Figures 7 to 9, and

Figures 11 and 12 are sectional views to a larger scale showing two different positions of the actuating mechanism employed in Figures 7 to 10.

In Figure 1, a driving shaft 2, a driven shaft 3 aligned therewith, and a counter-shaft 4 are mounted in a box or housing 1. The driving shaft 2, immediately at the point of its entry into the box 1, carries a fixedly mounted gear wheel 5. At the exit or output end of the box a gear wheel 6 is fixedly mounted upon the driven shaft 3.

Wheels 7, 8 and 9 are rotatably mounted upon the driving shaft 2 but they are not longitudinally displaceable thereon. The wheels 7, 8, 9 and 6 are permanently in mesh respectively with wheels 10, 11, 12 and 13 fixedly mounted upon the counter-shaft 4. Opposed faces of the gears of pairs 7, 8, and 9, 6 are constructed as clutch halves $7^1$, $8^1$, $9^1$, $6^1$. Selective clutch bodies 14 and 15 are arranged non-rotatably but longitudinally displaceably upon the driving shaft 2 between respective gear-wheel pairs. These clutch bodies are constructed at each end as halves of so-called synchronising clutches. With these devices, clutching is only effected when the parts to be clutched have been brought approximately to the same revolution speed. The synchronizing clutches as preferred are combined friction and dog clutches wherein the dog-clutch part is displaceable against resistance upon the associate friction clutch part, the friction clutch parts being engaged before the dog-clutch parts. The wheel 7 has a hub sleeve 16 extending towards the wheel 5. This sleeve is externally splined at 17 and a displaceable wheel 18 is slidable non-rotatably thereon. The wheel 5 on the driving shaft is in permanent mesh with a wheel 19 (Figure 2) of the preliminary gearing, the wheel 19 being secured upon a shaft 22 which carries two further fixed gear wheels 20 and 21. The wheel 21 in turn meshes with a wheel 23 fixed on a small counter-shaft 24 which also has fixed to it a wheel 25. The splined wheel 18 may be selectively brought into mesh either with the wheel 20 or with the wheel 25. The actuation of the clutches 14 and 15 is effected by the actuating sleeves 26 and 27, and the displaceable wheel 18 is moved by a third sleeve not shown in Figure 1. The sleeves 26, 27 are mounted upon separate actuating rods 28, 29 which are located parallel and side by side in one plane with an actuating rod, not seen in Figure 1, for the displaceable wheel 18. These rods are actuated by a common actuating lever 30 in an appropriate manner. The actuating diagram for the handle of this lever is shown in Figure 3. The power transmitting connections between the wheels and clutches will be understood from Figure 4.

For the first speed, the wheel 18 is brought into engagement with the wheel 20 (Figure 2). The drive of the shaft 2 is then through wheels 5, 19, 20 and 18, and is further transmitted through hub sleeve 16 and wheel 7 to wheel 10 fixed on the counter shaft 4. The drive is transmitted at the output end or exit through the pair of gear wheels 13, 6. For the second speed, the wheel 18 is slid out of engagement with the wheel 20 and the clutch 14 is brought into engagement with the clutch-half 8¹. The wheel 8 is thereby fixedly coupled to the driving shaft 2 which now drives the shaft 4 through the wheel 11. The drive is again transmitted out through the pair of gear wheels 13, 6.

For the third speed, the clutch 14 is brought into engagement with the clutch half 7¹. By this means, the wheel 7 is clutched to the driving shaft 2 which in this case drives the shaft 4 through the wheel 10. The drive is again transmitted out through the pair of gear wheels 13, 6.

For the fourth speed, the clutch 15 is brought into engagement with the clutch half 6¹ so that the wheel 6 is clutched to the driving shaft 2. Thus the fourth speed is the direct speed as the gears on the counter shaft do not partake in the transmission.

For the fifth speed, (which is an overdrive) the clutch 15 is brought into engagement with the clutch half 9¹. By this means the wheel 9 is clutched to the driving shaft 2 which now drives the shaft 4 through the wheel 12. The drive is again transmitted out through the pair of wheels 13, 6.

For the reverse speed, the displaceable wheel 18 (Figure 2) is brought into mesh with the wheel 25 whereby the wheel 7 is driven reversely. Otherwise the transmission of the power takes place precisely as in the first speed through the gears 7, 10, 13 and 6. In this case, also, the drive is transmitted out through the pair, 13, 6.

From the above it is clear that there is a constant output or exit drive by the gears 13, 6 for all indirect speeds, whereas hitherto known gearings have operated with a constant input drive. The arrangement according to the invention has the advantage that all pairs of gear wheels on both sides of the synchronising clutches are in each case drivingly connected to the driven shaft only, which is the Cardan shaft in the case of motor vehicles. Consequently only a small synchronising force is necessary and the loading of the synchronising clutch is slight.

A further advantage is that not only the wheels 7, 8, 9 and 6 to be synchronised but also the clutches 14, 15 and, in particular, the preliminary gearing for the first speed and the reverse speed lie above the oil level S. Consequently there is no great braking effect of oil masses. Also the wheels of the preliminary gearing may be made very small, since the little-used slowest speeds, namely the first speed and the reverse speed, are combined and both speeds are transmitted always through the large ratio of the wheels 7, 10 and 13, 6 of the third speed. The space 31 (Figure 1) obtained in front of the shaft 4 by the elevated preliminary gearing permits of the gearing being attached in simple fashion by flanges to a transverse member of the frame or the like. At least, such a transverse member 32 of the frame may pass through the corner space obtained, so that a shorter frame construction results. However, such an arrangement is not absolutely necessary as will be apparent from the modification seen in Figure 5.

In Figure 5, the counter-shaft 4 has an extension 4¹ which is splined or grooved at 33 for the displaceable wheel 18¹ to slide thereon in non-rotatable fashion. The wheel 18¹ corresponds to the displaceable wheel 18 in Figure 1. This wheel 18¹ may be brought into engagement either, for the first speed, with the wheel 5 on the driving shaft 2, or, for the reverse speed, with a reversing wheel 34 which is driven by the wheel 35 fixed upon the driving shaft 2 alongside the wheel 5.

The manner of operation of the above-described gearing may be advantageously effected in accordance with the diagram Figure 3. The manner of actuation in accordance with the diagram Figure 6 is even better in cases where, for example, the fifth speed is an overdrive. It is then advantageous to employ, for the gearing described, an actuating arrangement such as is illustrated by Figures 7 to 12. In this arrangement, the actuating arm 36 of the lever 30 engages in a sleeve 37 fixed to a horizontal rod 38 having a downturned ball-shaped end 39. This ball-shaped end 39 engages in the central hole 40 of an actuating plate 41 (Figure 10) which is slidable transversely in a frame 42 (Figures 7 to 9) and with the said frame is longitudinally displaceable beneath a fixed cover plate 43. This plate 41 has two downwardly extending projections 44 and 45 which are offset laterally (Figure 10) in relation to the longitudinal axis of the plate 41 passing through the centre of the central hole 40. On the side of each projection 44, 45 away from the central hole 40, the plate 41 has respective recesses 46, 47 (Figure 10) which are intended to receive small rolling bodies 48, and 49 (Figures 7, 11 and 12). These rolling bodies lie in appropriate notches 50 and 51 provided in actuating bars 52, 53, 54 of sleeves 55, 56 and 57. These sleeves are mounted upon respective actuating rods 58, 59 and 60 located side by side in one plane. Moreover, the rolling bodies 48 and 49 coact with the edges 61 and 62, located opposite to each other in the direction of actuation, of a slot or recess 63 in the cover plate 43. The actuating rods 58, 59 and 60 slide in a bearing bridge 65 against the resistance of spring-loaded balls 64 (Figure 7). In co-operation with notches 66 (Figures 7 and 9) cut in the actuating rods, the balls provided for the actuating rods are capable of holding the actuating rods in their position of actuation for the time being.

This above-described actuating arrangement is secured in place of the actuating rods 28 and 29 in Figure 1 over the gearing illustrated in the latter and, moreover, five forward speeds and a reverse speed are to be actuated by means of the hand lever 30 in accordance with the diagram of Figure 6. Here again the first speed and the reverse speed are also combined and the fifth speed is an overdrive. Furthermore, a reversal of the actuating movement is necessary for the actuating rods of the synchronising clutches 14 and 15 or for the second, third, fourth and fifth speeds, because the direction of actuation of the lever arm 30 likewise experiences a reversal due to the joint connection of the actuating arm 36 to the sleeve 37 on the rod 38. This is achieved by not allowing the actuating sleeves of the rods 58 and 59 to act directly upon the forks shifting the clutches 14 and 15, but by providing a two-armed lever 67 between these sleeves and the actuating forks as illustrated in Figure 7. Otherwise the gearing of Figure 1 remains completely unaltered. The actuating rod 58 serves for the actuation of the fourth and fifth speeds, the actuating rod 59 actuates the second and third speeds and the first speed and the reverse speed are actuated by the actuating rod 60.

The manner of operation of the actuating arrangement in Figure 7 may be explained by further reference to Figures 6, 9, 11 and 12: Assume that the handle of the actuating lever 30 is shifted to the point A of the diagram in Figure 6. Such a position of the lever corresponds to a position of the actuating plate 41 (Figure 10) in which its offset projections 44 and 45 lie in the position $a$, $a^1$ in Figure 9. Consequently, the projection $45=a$ lies behind the bar 53 ready for the second speed (Figure 11) and at the same time the pin $44=a'$ lies in front of the actuating bar 54 ready for the first speed (Figures 9 and 11). The driver is now free, in the lever position A (Figure 6), to engage either the first or the second speed. Assume that he decides upon the second speed: Accordingly, the lever arm 30 (Figure 7) is swung from the point A in the diagram of Figure 6 to the point II. This movement produces a reverse movement of the actuating knob 39 (Figure 11) which moves the actuating plate 41 to the left in the direction of the arrow II in Figure 11. The two rolling bodies 48, 49 and the projections 44, 45 are thereby also carried along to the left. A comparison of Figures 11 and 12 shows that the edge 62 of the cover plate 43 forces the rolling body 49 into its corresponding notch 51 on the actuating bar 53 and, moreover, the stop 45 carries the bar 53 with it to the left. The result is that the actuating rod 59, with which this bar is connected, is also carried along towards the left and, due to the reversing effect of the lever 67 (Figure 7), this movement to the left is converted into a movement to the right of the actuating fork of the clutch 14, the rightward movement of the latter effecting engagement of the second speed (Figure 4). As regards the other rolling body 48 carried to the left by the actuating plate 41 (Figures 11 and 12), this moves into the slot or recess 63 of the cover plate 43 and away from the edge 61. This permits the rolling body 48 to depart from its notch 50 in the bar 54 on the actuating rod for the first speed. Upon the movement of the actuating plate 41, the projection 44 located in front of the bar 54 moved away from the said bar, so that no actuating forces operate upon this bar and the actuating rod 60 for the first speed remains where it is.

The movement to the left of the actuating bar 53 (Figure 12) is effected by two positive influences. In the first place, the projection 45 abuts against the bar 53 and in the second place the rolling member 49 locks the bar 53 to the plate 41. The second speed can be declutched by this locking means. In accordance with the diagram in Figure 6, the lever arm 30 (Figure 7) is swung back from the point II in Figure 6 to the point A. Accordingly the device 39 (Figures 11 and 12) moves to the right again and consequently the plate 41 with the projections 44, 45 and the rolling members 48, 49 is shifted back again to the right from the position of Figure 12 into the position of Figure 11. Since the projection 45 will thereby be separated from the bar 53, it exerts no effect whatever upon this bar 53. On the other hand, the bar 53 is then alone carried back by the rolling member 49 locked in the notch 51 and the original central position in accordance with Figure 11 is re-established. The rolling member 48 rolls again into the corresponding notch 50 of the bar 54 and the lever 30 is again ready for actuation for the first or second speed. In entirely similar fashion, the first speed can also be actuated if the lever arm 30 (Figure 7) is moved with the actuating plate 41 in the reverse direction. The other speeds are likewise actuated in similar fashion. It will be immediately evident how this is possible if the position of the point B in Figure 6 and the corresponding position of the actuating projections 44, $45=b$ and $b^1$ in Figure 9 are compared. The possibility of actuating the third or fourth speed corresponds to point B in the diagram. In entirely correct sequence, the projection $44=b$ in Figures 7 and 9 is located in relation to the actuating bar 53 for the third speed and the projection $45=b^1$ is located in relation to the actuating bar 52 for the fourth speed. For the fifth speed, the projection 44 is brought into the position $c$ in accordance with Figure 9 and for the reverse speed the projection 45 is brought into the position $c^1$ in Figure 9.

The interposed rod 38 is not essential. For example, the actuating lever arm 36 might also be made to engage directly in the actuating plate 41. However, the provision of the intermediate rod 38 has the advantage that the actuating ball 68 can be placed at the end of the gear box as shown. By this means, good freedom on the floor for the driver's feet is ensured. The constructional examples selected are not limited to modes of operation in accordance with the actuating diagrams illustrated. Nevertheless the methods of actuation illustrated have proved the most advantageous. A particular advantage of the combination of the gearing of Figure 1 or Figure 3 with an actuating arrangement in accordance with Figures 7 to 12 is that only three actuating rods are necessary for the five speeds. Preferably skew teeth or helical teeth are selected for the gear teeth. The specific construction of the synchronising clutches may also, within the scope of the invention, be as desired.

Also, within the scope of the invention, for example, the preliminary gearing comprising the first speed and reverse speed may be constructed as a so-called silent gearing with wheels in permanent mesh and may be operated by means of synchronising clutches. Likewise, within the scope of the invention, the function of the clutch 14 between the wheels 7 and 8 may be exchanged, so that the first speed and the reverse speed includes the transmission ratio of the second speed. Particularly in regard to the constructional example of Figure 5, it is further indicated that very much quieter idle running can be achieved by the arrangement shown, and starting is not rendered more difficult by this arrangement even with a high degree of cold and thick oil.

I claim:

1. Change-speed gearing comprising several pairs of gear wheels permanently in mesh and adapted for giving second, third, fourth (direct) and fifth speeds, synchronising clutches between these pairs, preliminary gearing actuating the first speed and the reverse speed said preliminary gearing utilizing at the same time the gear wheels of the third speed, and a constant mesh output drive at the exit side of the gearing.

2. Five-speed change-speed gearing with a driving shaft penetrating the entire gear box and having its extremity mounted in an aligned driven shaft, a fixed gear wheel on the driving shaft immedaitely beyond its point of entry, a fixed gear wheel on the driven shaft immediately in front of its exit from the box, a countershaft with four fixed gear wheels in permanent mesh with respective wheels three of which are rotatable on the driving shaft whilst the fourth is the gear fixed on the driven shaft, a change-speed and synchronising clutch on the driving shaft between each of the pairs of gear wheels in permanent mesh, a sleeve is freely mounted on the driving shaft and extending towards the fixed wheel thereon, the said sleeve being rotatable with the wheel located nearest to said fixed wheel, a displaceable wheel non-rotatably mounted upon said sleeve, a preliminary gearing with shafts (22 and 24), reversing wheels (21, 23, 25) for the reverse speed, a wheel (19) permanently in engagement with the fixed wheel on the driving shaft, and a gear-change wheel (20) arranged alongside the wheel (19) with which the displaceable wheel (18) serving also for the actuation of the reverse speed may be brought into engagement for the actuation, for example, of the first speed.

3. Five-speed change-speed gearing with a driving shaft penetrating the entire gear box and having its extremity mounted in an aligned driven shaft, a fixed gear wheel on the driving shaft immediately beyond its point of entry, a fixed gear wheel on the driven shaft immediately in front of its exit from the box, a counter-shaft with four fixed gear wheels in permanent mesh with respective wheels three of which are rotatable on the driving shaft whilst the fourth is the gear fixed on the driven shaft, a change-speed and synchronising clutch on the driving shaft between each of the pairs of gear wheels in permanent mesh, a sleeve is freely mounted on the driving shaft and extending towards the fixed wheel thereon, the said sleeve being rotatable with the wheel located nearest to said fixed wheel, a displaceable wheel non-rotatably mounted upon said sleeve, a preliminary gearing with shafts (22 and 24), reversing wheels (21, 23, 25) for the reverse speed, a wheel (19) permanently in engagement with the fixed wheel on the driving shaft, and a gear-change wheel (20) arranged alongside the wheel (19) with which the displaceable wheel (18) serving also for the actuation of the reverse speed may be brought into engagement for the actuation, for example, of the first speed, the lower part of the gear box being constructed as a lubricating oil trough and the preliminary gearing and the first speed and the reverse speed and also the wheels mounted with the change-speed clutches on the driving shaft being located above the level of the lubricating oil.

4. In change speed gearing, a driving shaft, a driven shaft, a counter shaft, a plurality of gears arranged upon the driving shaft for rotation relative thereto, clutches for at will positively coupling said gears to the driving shaft, synchronizing means for said clutches effective in each case before engagement of the associated clutch, together with gears fixed upon the counter shaft and constantly in mesh with their respective gears upon the driving shaft, and means constantly intergearing said driven shaft and counter shaft for driving in both directions of rotation, a further gear on said driving shaft, a second counter shaft, gearing means on the second counter shaft intergearing with said further gear on said driving shaft and permitting an additional transmission between said further gear on said driving shaft and one of said gears arranged upon the driving shaft for rotation relative thereto.

5. In change speed gearing, a driving shaft, a driven shaft, a counter shaft, at least one gear arranged upon the driving shaft for rotation relative thereto, a clutch for at will positively coupling said gear to the driving shaft, synchronizing means for said clutch effective before engagement of the said clutch, together with a gear fixed upon the counter shaft and constantly in mesh with said gear upon the driving shaft, and means constantly intergearing said driven shaft and counter shaft for driving in both directions of rotation, a further gear on said driving shaft, a second counter shaft, gearing means on the second counter shaft intergearing with said further gear on said driving shaft and permitting an additional transmission between said further gear on said driving shaft and one of said gears arranged upon the driving shaft for rotation relative thereto.

6. In change speed gearing, a driving shaft, a driven shaft, at least one gear arranged upon the driving shaft for rotation relative thereto, a clutch for at will positively coupling said gear to the driving shaft, a second clutch for at will positively coupling said driving shaft to said driven shaft, synchronizing means for said clutches effective in each case before engagement of the associated clutch, together with a gear fixed upon the counter shaft and constantly in mesh with said gear upon the driving shaft, and means constantly intergearing said driven shaft and counter shaft for driving in both directions of rotation, a further gear on said driving shaft, a second counter shaft, gearing means on the second counter shaft intergearing with said further gear on said driving shaft and permitting an additional transmission between said further gear on said driving shaft and one of said gears arranged upon the driving shaft for rotation relative thereto.

7. In a change speed gearing, a driving shaft, a driven shaft, two counter shafts, a gear wheel mounted firmly upon the driven shaft, a second gear wheel constantly in mesh therewith and fixed for rotation with one of said counter shafts, a second gear fixed for rotation with the said counter shaft, a gear in constant mesh therewith and being mounted loosely upon the driving shaft, a further gear connected for rotation with the last mentioned gear, a gear co-operable with said last mentioned gear and mounted upon the second counter shaft, a further gear arranged upon this second counter shaft and a further gear mounted upon the driving shaft and meshing with said last mentioned gear.

8. In a change speed gearing according to claim 7, the combination wherein the last mentioned gear is fixed to the driving shaft and is in constant mesh with its cooperating gear upon the second counter shaft and whereby furthermore, the other gear upon the second counter shaft may be brought into mesh with its cooperating gear through axial sliding of one of said gears.

9. In a change speed gearing according to claim 7 the combination with means for coupling the said gear wheel which is loosely mounted upon the driving shaft with said shaft and a synchronizing means cooperating with said coupling means.

10. A change speed gearing according to claim 7, the combination with means for coupling the driven shaft with the driving shaft and with means for coupling the said gear wheel which is mounted loosely upon the driving shaft with said shaft and means cooperating with said couplings for synchronizing the parts to be coupled.

11. A change speed gearing according to claim 7 whereby the driving shaft and the driven shaft are co-axial and the two counter shafts are spaced from each other.

12. In a change speed gearing according to claim 7, the combination with a gear casing which encloses all of the gears and shafts thereof whereby the driving and driven shafts as well as the second mentioned counter shaft are arranged in the upper part of the casing and the first mentioned counter shaft in the lower part thereof so that when the casing is partly filled with oil only the first mentioned counter shaft is immersed therein.

13. In a change speed gearing according to claim 7, the combination wherein the axes of two counter shafts are spaced from each other and the one counter shaft extends over only a portion of the length of the gearing and the other counter shaft extends generally over the balance of the length of the gearing in combination with a casing in that part of the transmission mechanism into which the first counter shaft does not extend and arranged substantially in an extension thereof, whereby a construction element of the vehicle may pass through said casing and whereby the driven shaft and the second counter shaft extend above the upper portion of said casing.

14. In a change speed gearing according to claim 7, in combination with two additional gear wheels loosely mounted upon the driving shaft and two gear wheels constantly in mesh therewith and mounted fixedly upon one of said counter shafts, clutching means for optional coupling of the driving shaft with the driven shaft or with one of the said gear wheels mounted loosely upon the driving shaft, a further coupling means for optional coupling of the driving shaft with the one or the other of the remaining gear wheels which are mounted loosely upon the driving shaft and synchronizing means cooperating with each of the couplings for synchronizing the parts to be coupled.

15. In change speed gearing, a driving shaft, a driven shaft, a counter shaft, at least one gear arranged upon the driving shaft for rotation relative thereto, a clutch for at will positively coupling said gear to the driving shaft, synchronizing means for said clutch effective before engagement of the said clutch, together with a gear fixed upon the counter shaft and constantly in mesh with said gear upon the driving shaft, and means constantly intergearing said driven shaft and counter shaft for driving in both directions of rotation, a second counter shaft, a gear fixed for rotation with the driving shaft, another gear mounted concentric with the driving shaft, another gear mounted concentric with the driving shaft and connected for rotation with the first mentioned gear upon the driving shaft, and gearing means on the second counter shaft for permitting an additional transmission between said gear which is fixed for rotation with the driving shaft and said last-named gear which is concentric with the gearing shaft.

16. In change speed gearing, a driving shaft, a driven shaft, a counter shaft, a plurality of gears arranged upon the driving shaft for rotation relative thereto, clutches for at will positively coupling said gears to the driving shaft, synchronizing means for said clutches effective in each case before engagement of the associated clutch, together with gears fixed upon the counter shaft and constantly in mesh with their respective gears upon the driving shaft, and means constantly intergearing said driven shaft and counter shaft for driving in both directions of rotation, a second counter shaft, a gear fixed for rotation with the driving shaft, another gear mounted concentric with the driving shaft and connected for rotation with the first mentioned gear upon the driving shaft and at least two gears upon the said second counter shaft which cooperate with the two last mentioned gears.

17. In change speed gearing, a driving shaft, a driven shaft, a counter shaft, a plurality of gears arranged upon the driving shaft for rotation relative thereto, clutches for at will positively coupling said gears to the driving shaft, synchronizing means for said clutches effective in each case before engagement of the associated clutch, together with gears fixed upon the counter shaft and constantly in mesh with their respective gears upon the driving shaft, and means constantly intergearing said driven shaft and counter shaft for driving in both directions of rotation, a second counter shaft of a gear fixed to the driving shaft, a further gear upon the driving shaft which is connected with the gear which is mounted loosely upon the driving shaft and at least two gears upon the said second counter shaft which cooperate with the two last mentioned gears, whereby the driving and driven shafts are arranged co-axially and the two counter shafts are spaced from each other.

18. In a change speed gearing according to claim 1 in which the gears for the second, third, fourth, and fifth speeds are connected with the driven shaft continuously through the constant mesh output drive whereas the said preliminary gearing is substantially constantly connected with the driving shaft.

19. In a change speed gearing, a driving shaft, a driven shaft, two counter shafts, a driving member mounted upon one of said shafts for rotation relative thereto, power transmission means upon said shafts for achieving a plurality of gear ratios therebetween so constructed that the transmission means upon at least one of said counter shafts is constantly connected with the driven shaft and the transmission means upon the other counter shaft is constantly connected with the driving shaft, and a driven member connected with one of said counter shafts and arranged to be driven by said driving member.

20. In a change speed gearing the combination according to claim 28 wherein the said transmission means which are constantly in driving connection with the driven shaft are so formed as to achieve at least the highest speed drive whereas the transmission means which are constantly in driving connection with the driving shaft are so formed as to achieve at least the lowest speed drive.

21. In a change speed gearing, a driving shaft and a driven shaft, transmission members for achieving a direct drive and a plurality of higher speed drives in constant driving connection with the driven shaft, and transmission members for at least one lower speed drive which is in constant driving connection with the driving shaft.

22. In a change speed gearing, a driving shaft and a driven shaft, transmission members for achieving a direct drive and four higher speed drive ratios in constant driving connection with the driven shaft and transmission members providing lower speed drives and a reverse arranged in constant driving connection with the driving shaft.

23. In a change speed gearing according to claim 21 the combination with clutches each provided with synchronizing means for coupling the said transmission member for the higher speed drives with the driving shaft.

24. A change speed gearing according to claim 4 in which the further gear is constantly connected for rotation with the driving shaft and is continuously in mesh with the gear means on the second countershaft.

25. In change speed gearing, a driving shaft, a driven shaft, a countershaft, a plurality of gears arranged upon the driving shaft for rotation relative thereto, clutches for at will positively coupling said gears to the driving shaft, together with gears fixed upon the countershaft and constantly in mesh with their respective gears upon the driving shaft, and means constantly intergearing said driven shaft and countershaft for driving in both directions of rotation, a further gear on said driving shaft, a second countershaft, gearing means on the second countershaft intergearing with said further gear on said driving shaft and permitting an additional transmission between said further gear on said driving shaft and one of said gears arranged upon the driving shaft for rotation relative thereto.

26. In change speed gearing, a driving shaft, a driven shaft, a countershaft, at least one gear arranged upon the driving shaft for rotation relative thereto, a clutch for at will positively coupling said gear to the driving shaft, together with a gear fixed upon the countershaft and constantly in mesh with said gear upon the driving shaft, and means constantly intergearing said driven shaft and countershaft for driving in both directions of rotation, a further gear on said driving shaft, a second countershaft, gearing means on the second countershaft intergearing with said further gear on said driving shaft and permitting an additional transmission between said further gear on said driving shaft and one of said gears arranged upon the driving shaft for rotation relative thereto.

27. In change speed gearing, a driving shaft, a driven shaft, at least one gear arranged upon the driving shaft for rotation relative thereto, a clutch for at will positively coupling said gear to the driving shaft, a second clutch for at will positively coupling said driving shaft to said driven shaft, together with a gear fixed upon the countershaft and constantly in mesh with said gear upon the driving shaft, and means constantly intergearing said driven shaft and countershaft for driving in both directions of rotation, a further gear on said driving shaft, a second countershaft, gearing means on the second countershaft intergearing with said further gear on said driving shaft and permitting an additional transmission between said further gear on said driving shaft and one of said gears arranged upon the driving shaft for rotation relative thereto.

28. Change-speed gearing comprising several pairs of gear wheels permanently in mesh and adapted for giving a plurality of higher speeds, synchronizing clutches between these pairs, preliminary gearing actuating at least one lower speed, said preliminary gearing utilizing at the same time the gear wheels of one of the higher speeds and a constant mesh output drive at the exit side of the gearing.

29. In change speed gearing, a driving shaft, a driven shaft, a countershaft, at least one gear arranged upon the driving shaft for rotation relative thereto, a clutch for at will positively coupling said gear to the driving shaft, together with a gear fixed upon the countershaft and constantly in mesh with said gear upon the driving shaft, and means constantly intergearing said driven shaft and countershaft for driving in both directions of rotation, a second countershaft, a gear fixed for rotation with the driving shaft, another gear mounted concentric with the driving shaft and connected for rotation with the first mentioned gear upon the driving shaft, and gearing means on the second countershaft for permitting an additional transmission between said gear which is fixed for rotation with the driving shaft and said last-named gear which is concentric with the gearing shaft.

30. In a change speed gearing according to claim 28 in which the gears for the plurality of higher speeds are connected with the driven shaft continuously through the constant mesh output drive whereas the said preliminary gearing is substantially constantly connected with the driving shaft.

31. In a change speed gearing, a driving shaft, a driven shaft, two countershafts, one of said first mentioned shafts extending over the entire length of the countershafts, power transmission means upon said shafts for achieving a plurality of gear ratios therebetween so constructed that the transmission means upon at least one of said countershafts is constantly connected with the driven shaft and the transmission means upon the other countershaft is constantly connected with the driving shaft, there being at least one gear associated with each of said countershafts cooperating to cause a driving connection therebetween independently of said first mentioned shafts.

32. In a change speed gearing, a driving shaft, a driven shaft, two countershafts, power transmission means upon said shafts for achieving a plurality of gear ratios therebetween so constructed that the transmission means upon at least one of said countershafts is constantly connected with the driven shaft and the transmission means upon the other countershaft is constantly connected with the driving shaft, said driving shaft extending over the entire length of the countershafts and there being at least one gear associated with each of said countershafts cooperating to cause a driving connection therebetween independently of said first mentioned shafts.

THEODOR KÜMMICH.

CERTIFICATE OF CORRECTION.

Patent No. 2,305,927

December 22, 1942.

THEODOR KÜMMICH.

It is hereby certified that error appears in the printed specification of the above numbered patent requiring correction as follows: Page 5, second column, line 69, claim 20, for the claim reference numeral "28" read --19--; and that the said Letters Patent should be read with this correction therein that the same may conform to the record of the case in the Patent Office.

Signed and sealed this 4th day of December, A. D. 1945.

(Seal)

Leslie Frazer
First Assistant Commissioner of Patents.